United States Patent [19]

Bartley

[11] 3,841,547
[45] Oct. 15, 1974

[54] AUTOMATIC WELDING ASSEMBLY
[75] Inventor: John E. Bartley, Aptos, Calif.
[73] Assignee: Zeta International Engineering, Inc., Santa Clara, Calif.
[22] Filed: Aug. 21, 1972
[21] Appl. No.: 282,026

[52] U.S. Cl.................. 228/29, 219/125, 228/32
[51] Int. Cl............................................. B23k 27/00
[58] Field of Search .......... 228/25, 29, 32; 219/124, 219/125, 159

[56] References Cited
UNITED STATES PATENTS

| 3,025,386 | 3/1962 | Machain et al. | 219/125 R |
| 3,062,949 | 11/1962 | Lippart et al. | 219/125 R |
| 3,159,734 | 12/1964 | Cooksey et al. | 219/125 R |
| 3,215,812 | 11/1965 | Smith | 219/125 R |
| 3,688,076 | 8/1972 | Hill et al. | 219/125 R |
| 3,708,099 | 1/1973 | Nuccel | 228/29 |
| 3,776,449 | 12/1973 | Jungle | 228/29 |

Primary Examiner—Robert D. Baldwin
Assistant Examiner—Robert J. Craig
Attorney, Agent, or Firm—Snyder, Brown and Ramik

[57] ABSTRACT

An automatic welding assembly is adapted to weld around pipes at a job site in situations where very little radial clearance is available at the weld position. The welding apparatus includes a collet device which clamps onto the free end of the pipe, and a support assembly rotatable on the collet and located for the most part beyond the free end of the pipe outside the region of restricted radial clearance. The support assembly includes an extensible carrier and a welding head is supported by the carrier. The carrier is extensible axially alongside the pipe to position the welding head at the correct position for effecting the circumferential welding pass within the region of restricted radial clearance. The collet includes a gear and a drive motor on the support assembly has a pinion meshing with the gear to rotate the support assembly. Provision is made for adjusting the angularity of the welding head and mechanism is also provided to traverse the welding head back and forth during the circumferential path.

7 Claims, 17 Drawing Figures

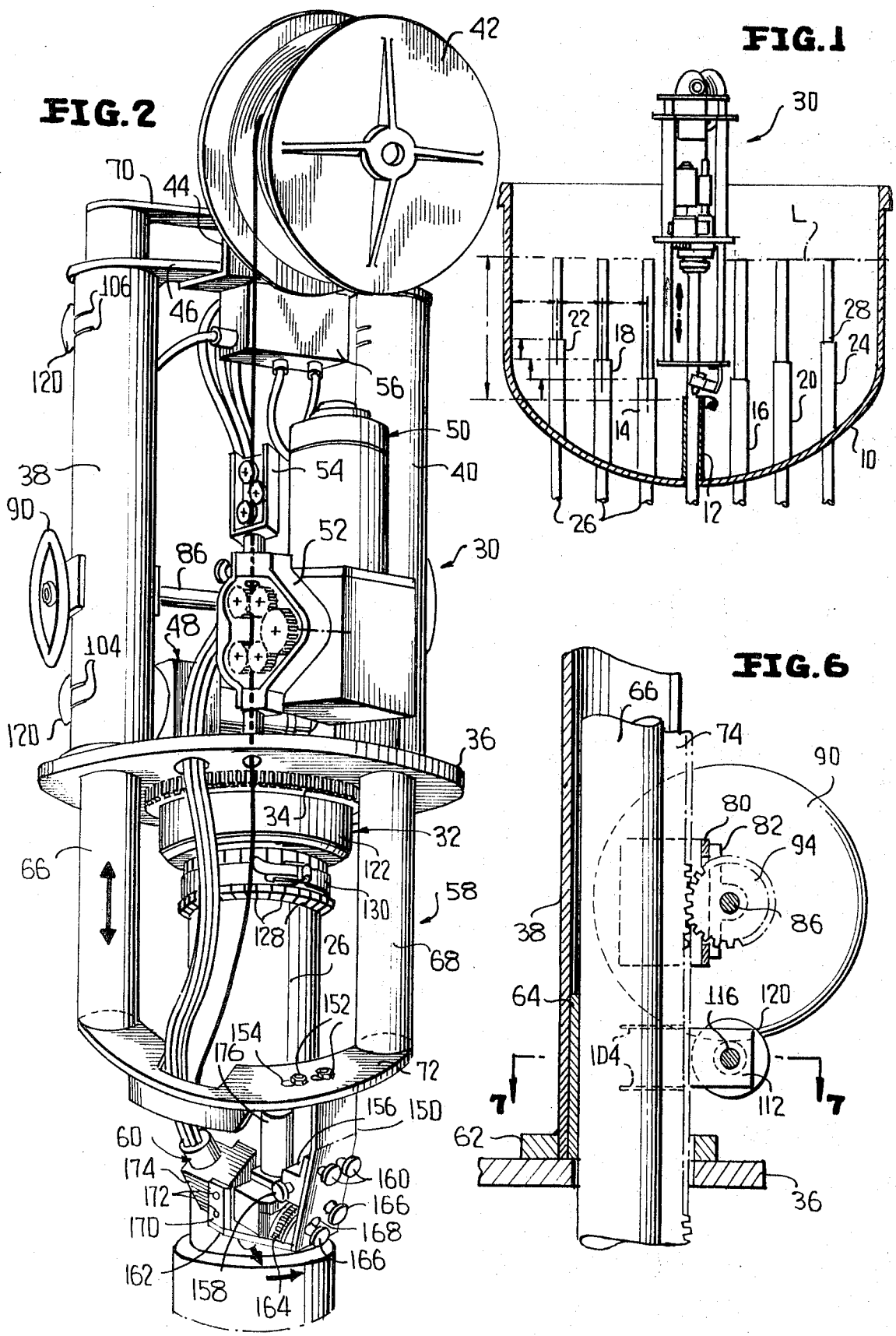

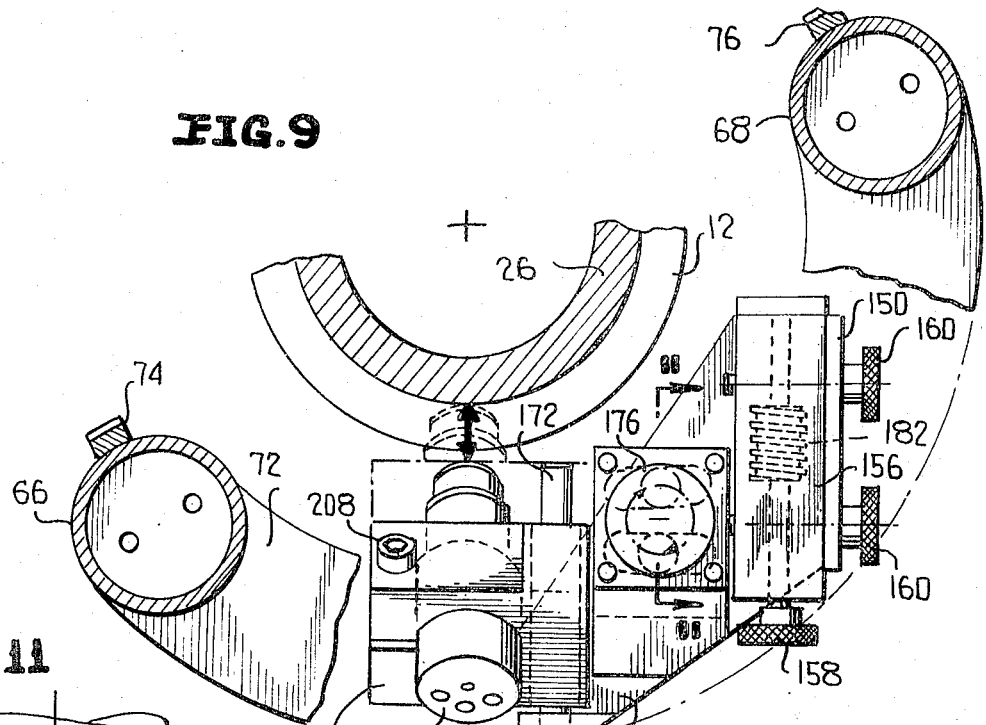
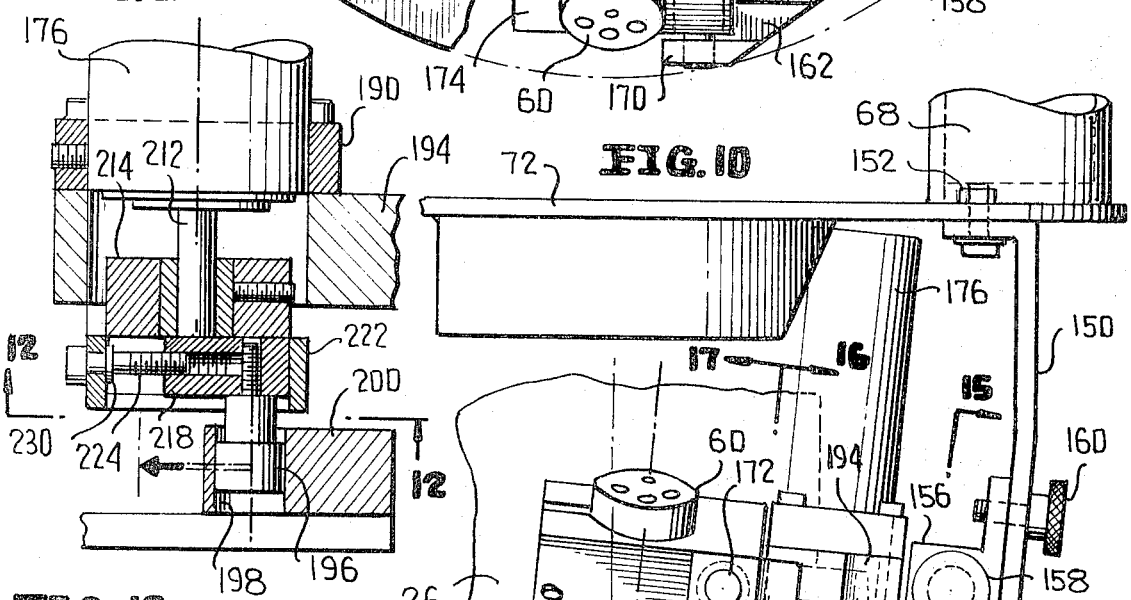
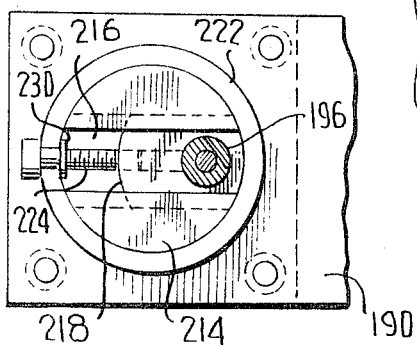

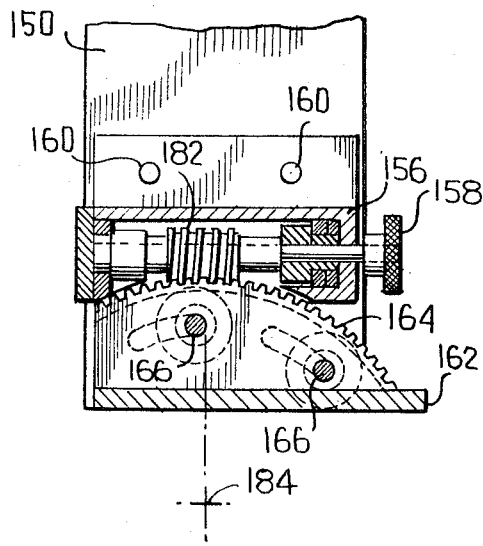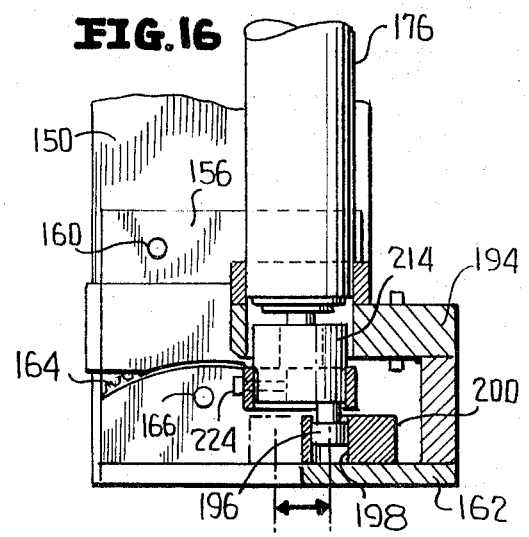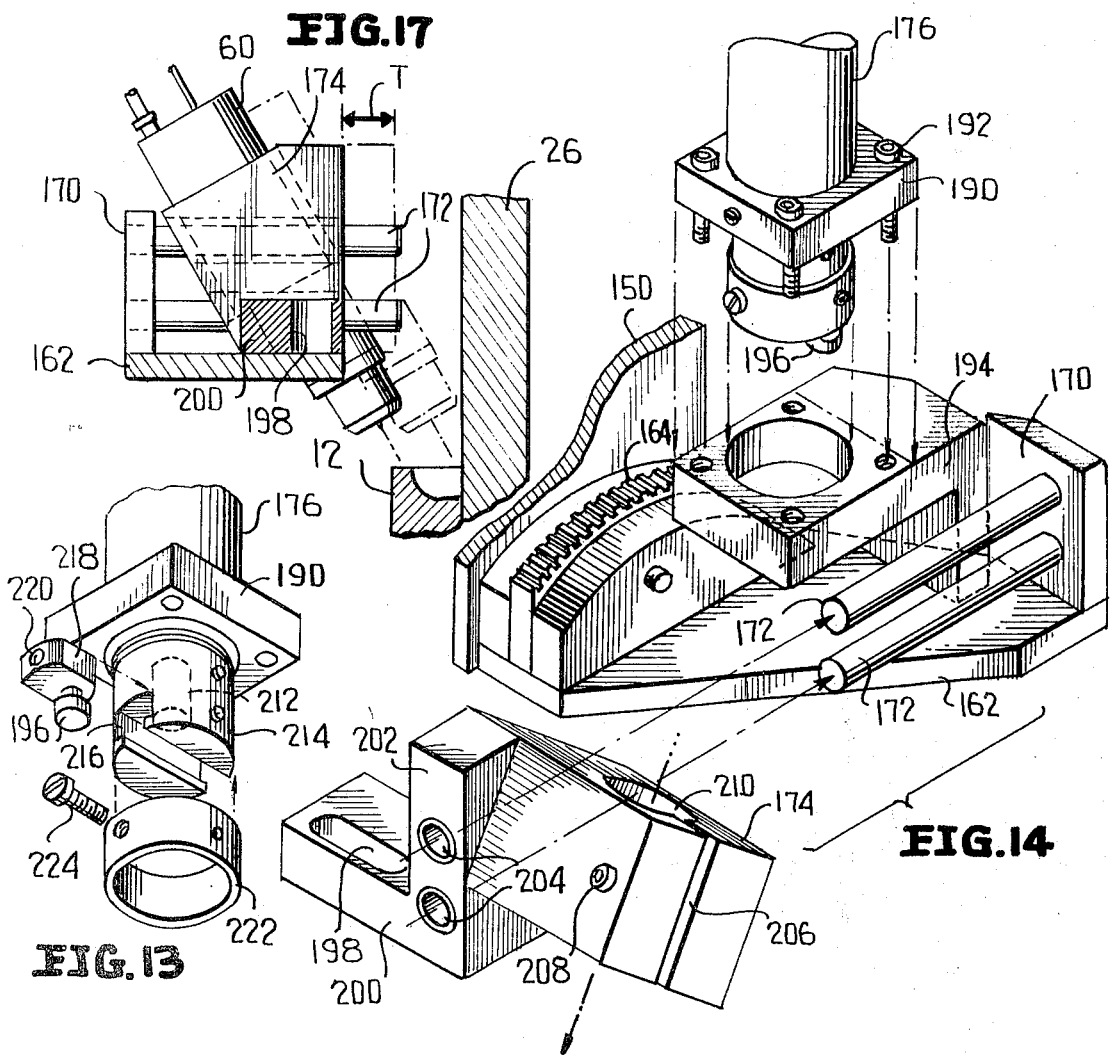

3,841,547

AUTOMATIC WELDING ASSEMBLY

BACKGROUND OF THE INVENTION

This invention relates to automatic welding apparatus of the type which is portable so as to be taken to a job site and moved around to the locations at which welds are to be effected.

In many situations, a weld joint is required to be made around a pipe in a region where there is very little radical clearance at the position at which the circumferential weld pass is to be effected. Such a situation arises, for example, during the building of a nuclear reactor and although there is the possibility that the weld joints could be made manually, they are required to pass very rigorous inspection and tests so that there is little likelihood that manual welding would produce the desired results. There are, of course, many other conceivable conditions in which a weld joint would be required circumferentially around a pipe located axially displaced from one end thereof and which would otherwise be substantially inaccessible by ordinary welding equipment.

BRIEF SUMMARY OF THE INVENTION

It is, accordingly, of primary concern in connection with this invention to provide a portable welding apparatus particularly well suited and adapted to effect a circumferential weld joint around a tubular member such as a pipe at an axially displaced position thereon remote from an end of the member.

Essentially, the arrangement according to the present invention involves a support means adapted to receive and affix to an end of a tubular member, same rotatably supporting an assembly which carries the main components of the device and which are located beyond the end of the tubular member. A drive means engages the support means and reacts against to carry the main components in a circular path and extensible carrier means is provided which extends and projects axially alongside the tubular member and which carries a welding head for effecting the circumferential weld joint. The extensible carrier means itself may be so dimensioned as to be accommodated within the restricted radial clearance available and is so constructed and arranged as to allow proper adjustments of the welding head both axially along the length of the tubular member and angularly with respect thereto so as to achieve the optimum positioning of the welding head. Additionally, means is provided for traversing the welding head back and forth during the welding operation, the movement being transverse to the welding path.

BRIEF DESCRIPTION OF THE DRAWING FIGURES

FIG. 1 is a vertical section taken through a nuclear reactor assembly partially constructed and illustrating the environment for which the present invention is particularly well suited;

FIG. 2 is a perspective view showing the welding assembly according to the prdsent invention in operative position on a pipe to be welded;

FIG. 6 is an enlarged section taken along the vertical section 6—6 in FIG. 3 and illustrating details of the extensible adjustment mechanism;

FIG. 9 is an enlarged horizontal section showing the welding head support arrangement;

FIG. 10 is an elevational view illustrating the assemblage shown in FIG. 9;

FIG. 11 is an enlarged vertical section taken substantially along the plane of section line 11—11 in FIG. 9 and showing details of the reciprocating mechanism;

FIG. 12 is a view taken along the plane of section line 12—12 in FIG. 11 showing further details of the reciprocating mechanism;

FIG. 13 is an exploded perspective view of the reciprocating mechanism;

FIG. 14 is an exploded perspective view illustrating details of the reciprocating mechanism and the welding head carrier;

FIG. 15 is an enlarged vertical section taken substantially along the plane of section line 15—15 in FIG. 10 illustrating details of the tilting mechanism;

FIG. 16 is a vertical section taken substantially along the plane of section line 16—16 in FIG. 10 showing further details of the tilting mechanism and the reciprocating mechanism; and FIG. 17 is a vertical section taken substantially along the plane of section line 17—17 in FIG. 10 illustrating the reciprocating motion.

DETAILED DESCRIPTION OF THE INVENTION

Figure 3:
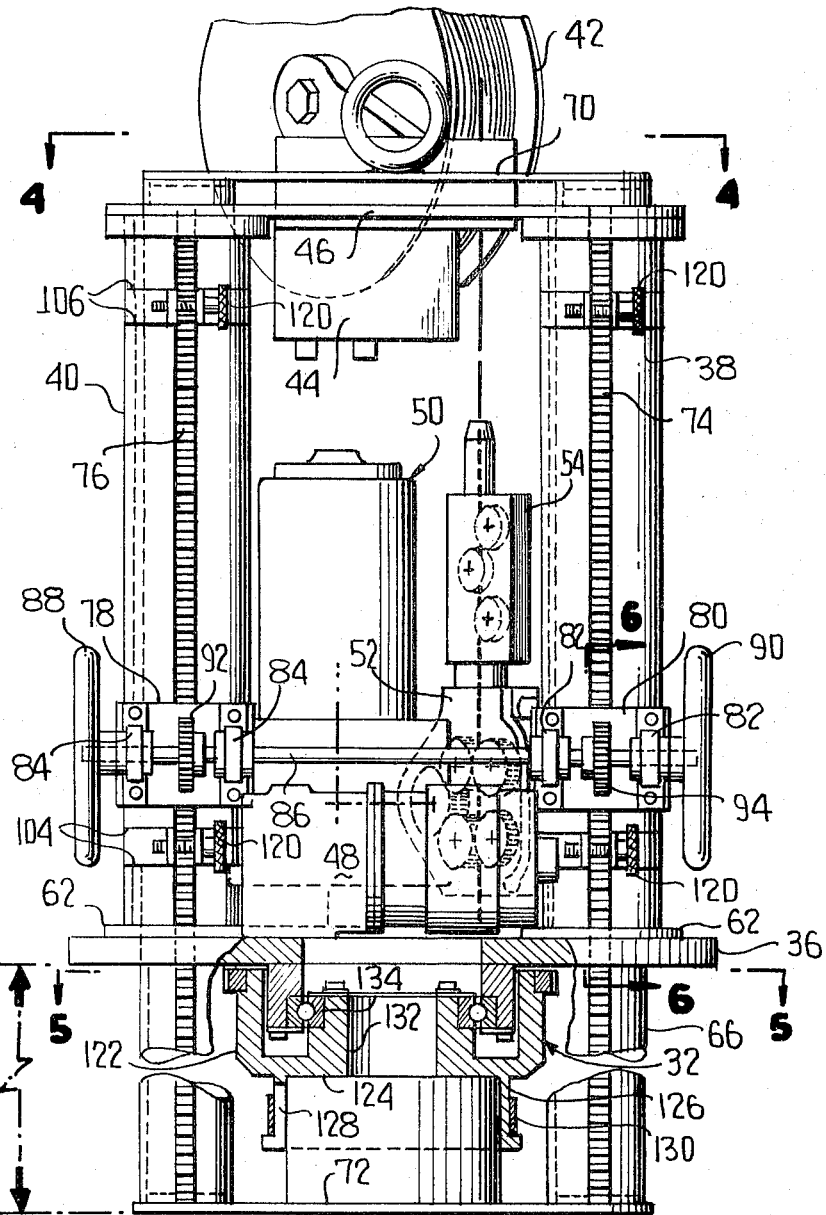
FIG. 3 is a vertical elevation, partly in section showing details of the welding apparatus.

Reference is had to FIG. 1 to illustrate a typical environment in which the present invention is particularly well adapted to operate. A portion of a nuclear reactor casing 10 is illustrated in FIG. 1 and as is conventional, the portion thereof shown is provided with a series of pipes which are welded thereto and which project upwardly at various heights. The central one of these elements is indicated by the reference character 12, same having the lowest height and being a single member centrally disposed as shown. Surrounding this central member is a first set of members only two of which are shown as indicated by reference characters 14 and 16 and these are at a somewhat greater height than the central member 12. Surrounding the first set is a second set of members, two of which are shown at 18 and 20 and a final set is provided, two of which are shown at 22 and 24. The various members in the sets are arranged in a symmetrical fashion around the central member 12 and each set is of a different height within the member 10 as is illustrated. It will be understood that each set is of a generally circular arrangement and the various members are so positioned within the device 10 as to be symmetrically arranged therein and uniformly spaced with their being but a few inches radial clearance between any two of the members.

Projecting upwardly from these various members are the pipes or tubular members indicated by the reference character 26 which project upwardly beyond the upper levels of the various members to a common height indicated by the level L in FIG. 1. These tubular members 26 ard temporarily supported in place and are to be welded to the associated members 12, etc., at the joints indicated by the reference character 28, for example.

The automatic welding apparatus according to this invention is indicated generally by the reference character 30 and is supported at the upper end of the various members 26 in turn to effect a circumferential weld pass or passes around the joints 28 and, as is clearly illustrated, there are a number of different extended adjustments of the apparatus 30 in order properly to position the welding head at the requisite location to effect the weldment.

The general arrangement of the welding arrangement according to this invention will be readily appreciated from FIG. 2. As shown, the welding apparatus 30 includes a support or collet means 32 which is affixed to the upper end of one of the pipes 26 so as to rigid therewith and this portion of the assembly includes a reaction gear 34, the purpose of which will be presently apparent. Rotatably supported on the means 32 is a support assembly which includes the table or platform 36 which surmounts the means 32 and has a pair of uprights 38 and 40 rigidly affixed thereto. The platform also supports a welding wire supply spool 42 which is mounted on a suitable bracket 44 on the cross head member 46; a drive means indicated generally by the reference character 48; a welding wire feed drive means 50; a welding wire feed mechanism 52 and a welding wire straightener 54. It will be understood that the components 50, 52 and 54 are of entirely conventional construction.

Also mounted from the table 36 is a control box 56 from which flexible coolant conduits extend to the welding head hereinafter described as well as inert gas supply and the requisite welding current conductor.

The support assembly also includes extensible means indicated generally by the reference character 58 and which carries the welding head indicated generally by the reference character 60.

The two uprights 38 and 40 are similarly constructed and each is in the form of a hollow tubular member as indicated in FIG. 6 having a mounting collar 62 secured at the lower end thereof and which is in turn affixed to the platform 36 as illustrated. Internally disposed within the member 38 adjacent the lower end as shown in FIG. 6 is a bushing 64 and a similar bushing is located in the upper end of the upright tube in each case, which bushings support the extensible post members 66 and 68 which project completely through the uprights 38 and 40 as illustrated and which are connected at their upper ends by the bridge piece 70 and at their lower ends by the arcuate bridge piece 72. The two extensible posts 66 and 68 are, therefore, rigidly interconnected at their opposite ends and are slidably received in the two uprights 38 and 40.

Figure 7:
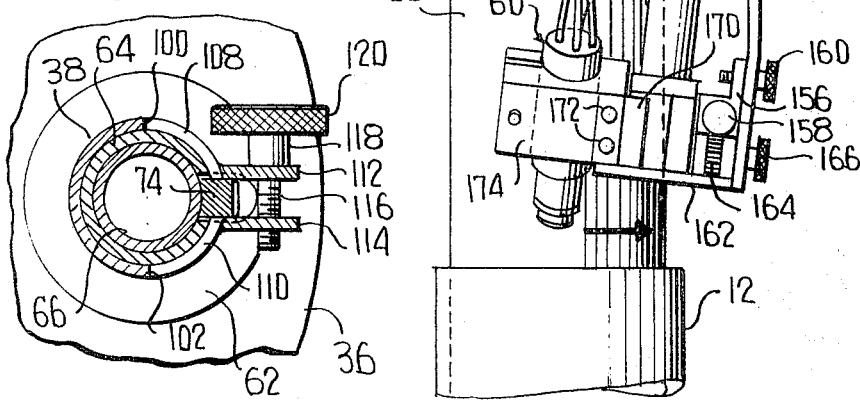
FIG. 7 is an enlarged transverse section taken substantially along the plane of section line 7—7 in FIG. 6 and showing details of the locking mechanism.

Each of these posts 66 and 68 is provided with a longitudinally extending toothed rack member 74 and 76 as illustrated in FIGS. 6 and 3 and the uprights 38 and 40 are provided with longitudinal slots receiving these two members 74 and 76 as is illustrated more clearly in FIG. 6. Bracket members 78 and 80 are affixed to the uprights 38 and 40 and support aligned pillow blocks 82 and 84 which support the cross shaft 86 provided at its opposite ends with the hand wheels 88 and 90. The cross shaft 86 has affixed thereto a pair of pinions 92 and 94 meshing with the respective racks 76 and 74 so that when the hand wheels 88 or 90 are rotated, the posts 66 and 68 are extended or retracted as the case may be. The various bushings supporting the posts 66 and 68 as well as the members 38 and 40 are of course provided with the longitudinal slots as aforementioned to receive the racks 74 and 76, see particularly FIG. 7. FIG. 6 also illustrates the manner in which the extended position is locked and held. As illustrated, each upright 38 or 40 is provided with saw cuts substantially half way through, the bottom portions of one cut being indicated by the reference characters 100 and 102 in FIG. 6 and as will be evident from FIG. 3, a pair of such cuts 104 is associated with the bottom of each member 38 and 40 and similar pairs of cuts 106 are disposed adjacent the upper end thereof. These saw cuts leave free arcuate portions 108 and 110 in each case and clamping ear members 112 and 114 are affixed thereto as by welding and are adapted to grip the opposite sides of the associated racks 74 and 76 as the case may be. For this purpose, a clamping screw 116 is provided threadedly engaged in the member 114 and having an enlarged shoulder portion 118 bearing against the other member 112 and provided with a hand knob 120 for selected manipulation as will be readily apparent. It will be appreciated that the ears 112 and 114 are so arranged that when they grip and engage the opposite sides of the racks, the bushings 64 are not deformed, the sole gripping action taking place against the rack bar 74 and 76.

As can be seen more clearly in FIG. 3, the support or collet means 32 preferably includes a hub portion 122 presenting a recess providing a seat 124 for the upper end of the pipe 26 in each case and defining a cup portion 126 surrounding the pipe as shown, same being provided with longitudinal slots 128 spaced circumferentially therearound and having an associated clamping ring 130 whereby the collet portion may firmly grip the upper end of the associated pipe 26 to affix and support the entire assemblage therefrom. The hub 122 of course carries the aforementioned reaction gear 34, as shown. The hub also includes a central portion 132 providing a seat for the bearing 134 whereby the support assembly and in particular the platform 36 is rotatably supported with respect thereto so as to be rotatable about an axis substantially coincidental with the longitudinal axis of the pipe 26.

Figure 4:
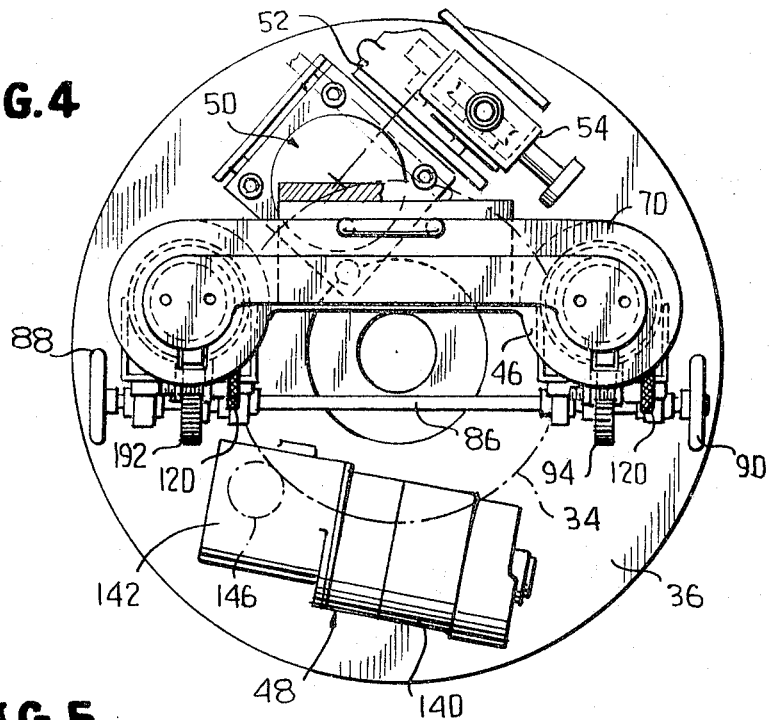
FIG. 4 is a horizontal section taken substantially along the plane of section line 4—4 in FIG. 3 and showing certain arrangements of the component parts.
Figure 5:
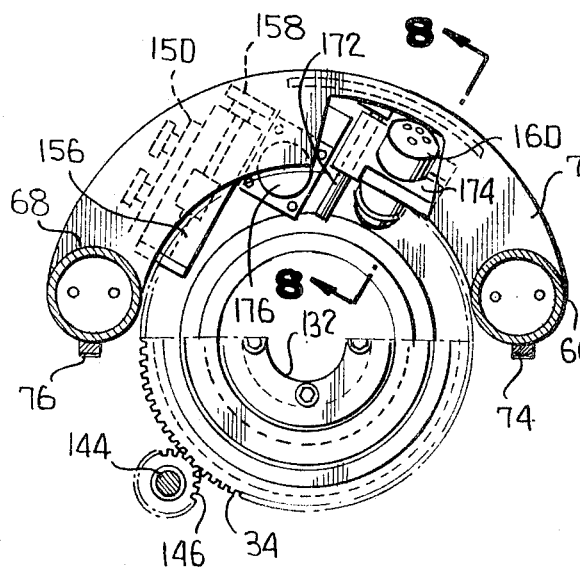
FIG. 5 is another horizontal section taken along the plane of section line 5—5 in FIG. 3 illustrating further details.
Figure 8:
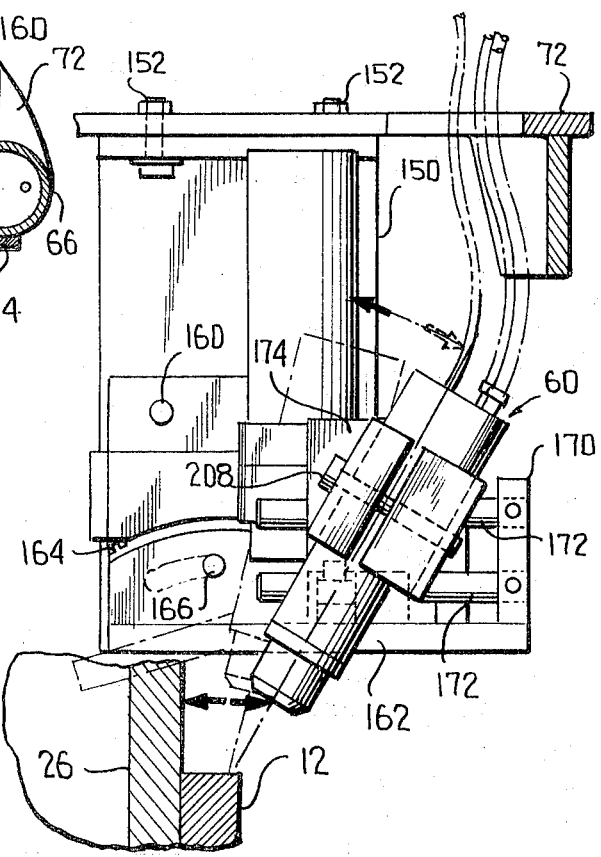
FIG. 8 is an enlarged vertical section taken substantially along the plane of section line 8—8 in FIG. 5 illustrating angular adjustment of the welding head.

The drive means 48 as can be seen better in FIGS. 4 and 5 includes a motor casing 140 and a gear box portion 142 having an output shaft 144 projecting axially downwardly through the platform 36 and carrying a pinion 146 meshing with the reaction gear 34. As a result, the entire support assembly including the platform 36 and the parts carried thereby are rotatably driven and carried about the circumference of the reaction gear 34.

The lower bridge piece 72 as can be seen in FIG. 2 carries a depending bracket 150, the fasteners 152 being provided for this purpose and a limited degree of adjustment of this bracket 150 is permitted by virtue of the elongate slots 154 in the lower bridge piece 72, as shown. The bracket 150 carries a housing 156 which rotatably supports a worm gear which is manually rotatable by means of a knob 158 and the housing 156 is secured to the bracket 150 by means of the removable fasteners 160. A carrier member including a plate 162 has a gear sector 164 affixed thereto which is in mesh with the worm associated with the knob 158 and fastening members 166 operating within elongate slots 168 allow limited motion of the carrier assembly with respect to the bracket about a pivotal axis hereinafter more particularly described. The plate 162 has an upright member 170 thereon carrying a pair of guide rods 172 which slidably support a welding head support block 174 for movement therealong under the control of the drive motor 176, all as hereinafter more particularly described.

Thus, as is shown in FIG. 15, the housing 157 rotatably supports the shaft 180 to which the knob 158 is secured and has affixed thereto a worm gear 182 which is in mesh with the gear sector 164 so that when the fasteners 166 are loosened, rotation of the member 158 will cause the gear sector 164 which is affixed to the plate 162 to rotate about a center 184 as illustrated which is approximately centered at the welding arc, as will be readily appreciated. This arrangement is also clearly illustrated in FIG. 14 in exploded perspective fashion.

The drive motor 176 has a mounting plate portion 190 which is removably secured as by the fasteners 192 to the support block 194 affixed to the plate 162 and as will be described more particularly hereinafter, this drive motor has an adjustable eccentric member 196 which operates in the elongate slot 198 of the welding head oupport block as illustrated best in FIG. 14. This slot 198 is located within a horizontal arm portion 200 of the block and the vertical arm portion 202 thereof is provided with the bores 204 which receive the respective guide rods 172, it being appreciated that the slot 198 is oriented in a transverse plane with respect to the axes of the rods 172. The block body is split as indicated as 206 and receives an adjustable screw member 208 so as to clamp and release the welding head allowing same to be positioned axially within the bore 210, as will be readily appreciated.

As can be seen in FIG. 13, the drive motor 176 has a depending output shaft 212 to which is secured an adapted member 214 having a transverse T slot 216 therein. Slidably received in this T slot 216 is the slide block 218 having a threaded bore 220 and carrying the aforementioned cam element 196 which operates within the elongate slot 198 of the welding head support block assembly.

A sleeve 222 is removably secured to the lower end of the adapter 214 in embracing relation thereto and carries an adjusting member 224 which threadedly engages in the previously mentioned bore 220 in the block 218. As will be more evident from FIG. 11, adjustment of the member 224 which is prevented from axial displacement relative to the sleeve 222 by means of a suitable circlip or similar device 230, will shift the block 218 so that the member 196 is more or less eccentric with respect to the output shaft 212 of the motor 176. In this way, the stroke imparted to the welding head support assembly 174 may be adjusted as desired. As is shown in FIG. 17, the welding head 60 is supported normally at an angle of approximately 30° from the vertical when the guide rods 173 are horizontal and the gear sector arrangement for tilting is capable of approximately 15° of angular adjustment so as to rock the inclination of the welding head 60 and of course correspondingly of the guide rods 172 by a similar amount. In this fashion, as is clear from FIG. 17, the welding head may be properly positioned with respect to the weld joint and the back and forth traverse which is indicated by the double headed line T effects the requisite traverse of the welding head as the circumferential welding pass is being made.

What is claimed is:

1. A welding assembly adapted to be affixed to and supported on an end of a tubular member to be welded while effecting a circumferential weld therearound at a position disposed axially from said end thereof, comprising in combination:

support means adapted to receive and affix to said end of a tubular member;

a table surmounting said support means;

means interconnecting said table and said support means for rotatably mounting said table about a first axis substantially coincidental with the axis of the tubular member;

a pair of elongate support members fixed to said table radially outwardly of said first axis and extending parallel to said first axis;

an extensible carrier bar slidably received in each support member to project beyond said table alongside the tubular member;

a carrier foot interconnecting those ends of said carrier bars projecting beyond said table;

a carrier body mounted on said carrier foot about a tilting axis lying in a plane transverse to the tubular member;

a welding head support member mounted on said carrier body;

means for adjustably positioning said carrier body about said tilting axis;

a welding head fixed to said welding head support member;

means supported from said table for feeding welding wire to said welding head;

means for selectively extending said carrier bars to position the welding head along the tubular member; and drive means carried by said table and reacting with said support means to rotate said table about its axis thereby to move said welding head circumferentially around the tubular member.

2. A welding assembly as defined in claim 1 including guide means mounting said welding head support member for in and out movement with respect to said carrier body, and transversing means on said carrier body for reciprocating said welding head support member back and forth along said guide means during a welding operation.

3. A welding assembly as defined in claim 2 wherein said traversing means includes an adjustable eccentric for varying the reciprocating stroke of said welding head support member.

4. An automatic welding assembly comprising, in combination:

collet means adapted clampingly to engage an end portion of a tubular member which is to be welded circumferentially at a position axially displaced from said end portion;

a support assembly rotatably mounted on said collet means and disposed in major part beyond said end portion of the tubular member, said support assembly including drive means interacting with said collet means to rotate the support assembly and effect a circumferential welding pass around said tubular member aud extensible carrier means for establishing the axial position at which said welding pass is made; and a welding head supported by said extensible carrier means;

said support assembly including a platform disposed in a plane perpendicular to the axis of said tubular member and projecting radially outwardly of said collet means, and a pair of parallel uprights fixed to said platform radially outwardly of said collet means and extending parallel to said axis of the tubular member; said extensible carrier means including a pair of carrier bars slidably received in said uprights, means for selective extension and retraction of said carrier bars relative to said uprights, and a carrier foot interconnecting said carrier bars, said welding head being mounted on said carrier foot.

5. An automatic welding assembly as defined in claim 4 including a bracket fixed to said carrier foot, a plate pivotally connected to said bracket about a pivot axis transverst to the extension and retraction path of the carrier foot, means for selectively adjusting the position of said plate about said pivot axis, a pair of parallel guide rods fixed to said plate and having their axes contained in a plane perpendicular to said pivot axis, a welding head support block slidably engaged with said guide rods, and second drive means for reciprocating said support block back and forth on said guide rods, said welding head being carried by said support block.

6. An automatic welding assembly as defined in claim 5 wherein said second drive means comprises a drive motor fixed to said plate and having an output shaft, an eccentric driven by said output shaft, and said support block having a cam recess receiving said eccentric. An automatic welding assembly as defined in claim 6 wherein said eccentric is adjustable selectively to establish the stroke of reciprocatory movement of said support block.

* * * * *